Figure 1:
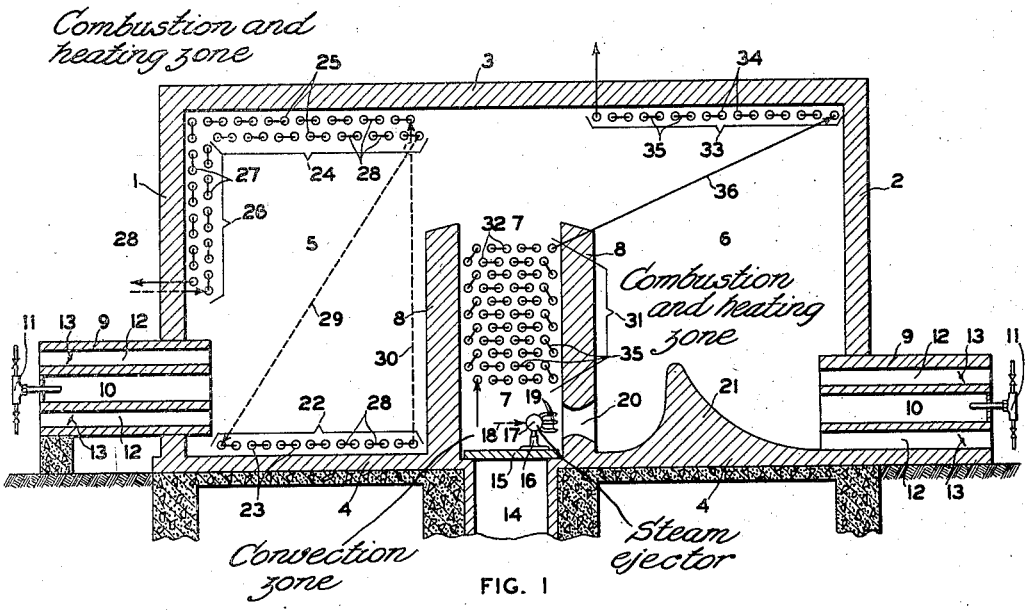

Dec. 21, 1937.  M. W. BARNES  2,102,876

HEATING OF FLUIDS

Filed Oct. 30, 1933

INVENTOR
MARION W. BARNES
BY
ATTORNEY

Patented Dec. 21, 1937

2,102,876

UNITED STATES PATENT OFFICE 2,102,876

HEATING OF FLUIDS

Marion W. Barnes, Chicago, Ill., assignor to Universal Oil Products Company, Chicago, Ill., a corporation of Delaware Application October 30, 1933, Serial No. 695,765

6 Claims. (Cl. 196—47)

This invention relates to the heating of fluids, and more particularly refers to improvements in the type of furnace and method of heating wherein separate streams of fluid of different characteristics are each subjected to independently controlled heating conditions in the same furnace structure, said improvements comprising provision for tempering the heating conditions to which one of said separate streams is subjected by the recirculation of flue gases over the fluid conduit through which this stream is passed, while maintaining independent control over the heating conditions to which the other stream of fluid is subjected.

In the pyrolytic conversion of hydrocarbon oils it is essential to employ different heating conditions for different types of oils and in some modern cracking installations different oils are simultaneously subjected to independently controlled heating conditions in the same furnace. In such processes much more severe heating conditions are ordinarily required for one stream of oil than those most advantageous for the treatment of the other stream of oil.

I have previously disclosed an improved form of furnace and method of heating, specifically adapted to the simultaneous treatment of two separate streams of oils of different characteristics wherein each stream is subjected to independently controlled heating conditions. This furnace comprises two separate and independently fired combustion and heating zones in the same furnace structure with a fluid conduit disposed in each and each devoted to the heating of a separate stream of oil whereby the heating conditions to which each stream of oil is subjected in the fluid conduit of the heating zone to which it is supplied are independently controlled by independent control of the firing conditions in each combustion zone of the furnace. In this furnace a centrally located heating zone, having a fluid conduit or conduits through which either or both streams of oil may be passed, derives heat from the combustion gases from both of said independently fired combustion zones. The heating conditions in said centrally located heating zone depend, of course, upon the firing conditions employed in both combustion zones and vary with any change in the firing conditions in either combustion zone. However, the heating conditions in the centrally located heating zone are, in any case, milder than those employed in the combustion zone utilizing the high rates of heating and are, in most cases, milder than those employed in either combustion zone of the furnace.

The present invention is concerned with improvements to the general type of furnace and method of heating above described and provides for tempering the firing conditions employed in the combustion zone wherein relatively low rates of heating are desired by recirculating flue gases thereto from the centrally located heating one. This greatly improves the thermal efficiency of the furnace, as compared with a similar furnace wherein no flue gas recirculation is employed, while permitting the use of high rates of heating in the combustion and heating zone to which flue gases are not recirculated. Furthermore, any change in the firing conditions in the combustion and heating zone employing high rates of heating, which would ordinarily cause a corresponding change in the heating conditions in the centrally located heating zone, may be compensated for, in the present invention, by a change in the rate of flue gas recirculation, so that greater independence of the firing conditions in the combustion and heating zone to which flue gases are not recirculated is obtained in the centrally located heating zone.

In the preferred embodiment of the invention the stream of oil to be subjected to relatively mild heating conditions is passed through the fluid conduits in the centrally located heating zone and in the independently fired combustion and heating zone to which flue gases are recirculated. In such cases complete independence is maintained over the heating conditions to which each stream of oil is subjected, the conditions in the heating zone to which no flue gas is recirculated being varied at will by changing the firing conditions in this zone to suit requirements, while the heating conditions in the other independently fired combustion and heating zones and in the centrally located heating zone are controlled by the firing conditions and by the rate of flue gas recirculation, a change in either or both of these methods of control being utilized to compensate for any increase or decrease in the temperature of the combustion gases passing from the combustion zone to which no flue gas is recirculated to the centrally located heating zone.

One specific embodiment of the present invention comprises a furnace having two combustion and heating zones, means for independently supplying combustible materials to each combustion and heating zone, whereby to independently control the heating conditions therein, a separate heating zone within the same surface structure, means for passing combustion gases from both independently fired combustion and heating zones through said separate heating zone, a fluid conduit located in one independently fired combustion and heating zone, means for passing a continuous stream of fluid therethrough and subjecting the same therein to high rates of heating, fluid conduits located in the other combustion and heating zone and in said separate heating zone, means for passing another fluid in a continuous stream therethrough and subjecting the same therein to milder rates of heating and means for recirculating combustion gases having passed over the fluid conduit in said separate heating zone to the independently fired combustion and heating zone wherein said relatively low rates of heating are employed.

The invention is, of course, not limited to use in the conversion of hydrocarbon oils nor to any specific furnace structure. The features of the invention may be utilized to advantage whenever it is desired to subject separate streams of fluids to independently controlled heating conditions in the same furnace structure, particularly when high rates of heating are desired for one stream and milder rates of heating may be employed to advantage for the treatment of the other stream.

As a modification of the specific form of furnace above described, which is also within the scope of the invention, the fluid conduit through which the material to be subjected to relatively mild heating conditions is passed may be disposed entirely within the heating zone to which combustion gases from both independently fired combustion zones are supplied, no fluid conduit being utilized in the combustion zone to which flue gases are recirculated. In such cases, the addition of fresh combustion products to the recirculated flue gases passing through the zone to which they are recirculated may or may not be employed, as required, and by regulation of the firing conditions in each combustion zone and regulation of the quantity of flue gases recirculated, independent control is obtained between the heating conditions to which each stream of fluid is subjected.

The accompanying diagrammatic drawing (Figs. 1 and 2) illustrates two specific forms of furnace structure embodying the features of the present invention.

Figure 2:
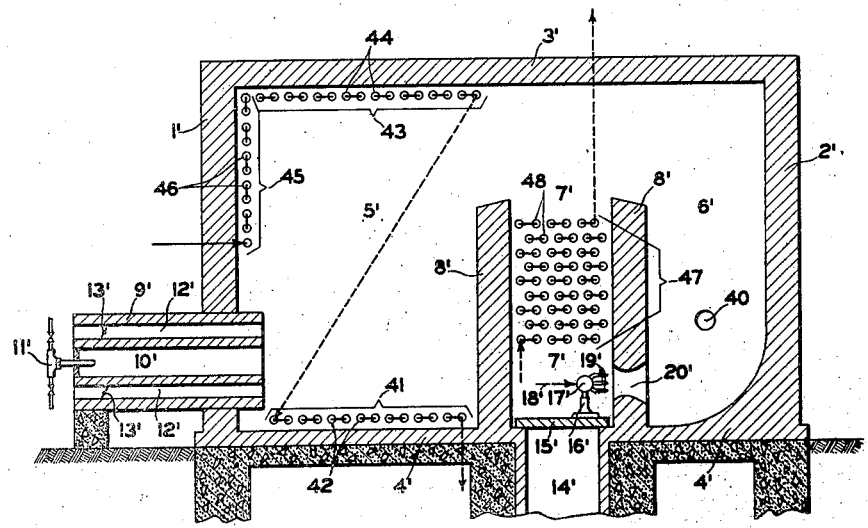

Fig. 1 is a sectional elevation of a furnace having a fluid conduit in each independently fired combustion and heating zone as well as in a separate centrally located heating zone, and Fig. 2 is a sectional elevation of a somewhat modified form of the same type of furnace illustrated in Fig. 1, having no fluid conduit disposed within the combustion zone to which spent flue gases from the centrally located heating zone are supplied.

Referring to Fig. 1 of the drawing, the main furnace structure comprises end walls 1 and 2, a roof 3, a floor 4 and side walls, only one of which appears in the drawing, in elevation, since the view of the furnace is taken in cross-section.

The furnace is divided into separate combustion and heating zones 5 and 6 and another separate, centrally located, heating zone 7 by means of bridge walls 8.

Combustible fuel may be independently supplied in regulated quantities to combustion zones 5 and 6 through firing tunnels 9. Preferably, a plurality of such firing tunnels are employed for each combustion zone, although only one tunnel communicating with each combustion zone is illustrated in the drawing. Firing tunnels 9, in the case here illustrated, comprise a combustion tunnel 10 through which fuel of any desired form, such as oil, gas or pulverized solid fuel, is supplied to the combustion and heating zones by means of any suitable form of burner 11. A regulated portion of the air required for combustion of the fuel is preferably also supplied to the combustion and heating zones through combustion tunnel 10 and at least a portion of the combustion takes place in tunnel 10, regulated by the proportion of the total air required for combustion which is supplied through this zone. Additional air for combustion and any desired excess air may be supplied direct to the combustion and heating zones of the furnace through ducts 12, located above and beneath combustion tunnel 10, regulated by dampers 13.

Preferably, combustion of the fuel supplied to combustion and heating zones 5 and 6 is substantially completed therein and the combustion gases from both zones 5 and 6 pass over bridge walls 8 and downward through heating zone 7 in commingled state, the final flue gases being withdrawn from the furnace through flue 14 to a suitable stack (not shown). Baffles 15, disposed at spaced intervals above flue 14 serve, in the case illustrated, to evenly distribute the combustion gases through heating zone 7.

An ejector 16 comprising, in the case illustrated, a header 17 to which steam is supplied, as indicated by the dotted line 18, have a multiplicity of jets 19 discharging steam through a suitable Venturi throat 20 serves, in the particular case here shown, as a means of recirculating a regulated portion of the flue gases from the lower portion of heating zone 7 to combustion and heating zone 6. Preferably, a suitable baffle or deflector 21, in the lower portion of combustion zone 6, serves to direct the materials undergoing combustion from firing tunnel 9 and the recirculated flue gases from heating zone 7 to the upper portion of the heating zone, wherein they are intimately commingled, the resulting commingled gases passing over bridge wall 8 and then downward through heating zone 7, in commingled state with the combustion gases from combustion and heating zone 5. It will be understood that flue gas recirculation from heating zone 7 to combustion zone 6 may be induced in any other well known manner (not shown), for example, by means of a flue gas recirculating fan or the like. In the case here illustrated, the amount of flue gas recirculation is regulated by the amount of steam supplied to the jets and by regulation of suitable dampers (not shown) in flue 14.

A bank of tubes 22 comprising, in the case illustrated, a single horizontal row of horizontally disposed tubes 23 is located adjacent the floor of combustion and heating zone 5 and receives, primarily, radiant heat from the materials undergoing combustion and the hot refractory walls of the furnace. Another tube bank 24 comprising, in the case illustrated, two horizontally parallel rows of horizontal tubes 25 is located adjacent the roof of combustion and heating zone 5 and another tube bank 26 comprising, in the case here illustrated two vertically parallel rows of horizontal tubes 27 is located adjacent wall 1 of the furnace in combustion and heating zone 5. Tube banks 24 and 26 receive radiant heat from the materials undergoing combustion in zone 5 and from the hot refractory walls of the furnace as well as an appreciable quantity of convection heat from the hot combustion gases passing over the tubes. Adjacent tubes in each of the banks are connected at their ends in series by means of suitable return bends or headers (not shown). The connections between adjacent tubes at their near ends are indicated in the drawing by the lines 28.

Tube banks 22, 24 and 26 comprise a fluid conduit wherein the conditions of heating to which the fluid passing therethrough is subjected are controlled by regulation of the firing conditions in combustion and heating zone 5. In the case here illustrated, a stream of fluid enters the bottom tube in the exposed row of bank 26, flowing in a general upward direction through the adjacent tubes in this row in series, then in series through adjacent tubes in the exposed row of tube bank 24, emerging from the end tube in this bank most remote from wall 1 of the furnace and passing, as indicated by the dotted line 29, to the end tube of bank 22 most adjacent end wall 1, passing, in series, through the adjacent tubes of this bank, emerging from the opposite end and passing, as indicated by the dotted line 30, to the tubes in the shielded row of bank 24 most remote from end wall 1 of the furnace, then through the adjacent tubes of this row in series and finally in a general downward direction through adjacent tubes of the shielded row of bank 26, in series, and out of the furnace.

It will be understood that the invention is not limited to the use of the particular type of fluid conduit illustrated in the drawing nor to the particular flow of fluid through the conduit illustrated. For example, bank 22 may comprise more than a single row of tubes and similarly banks 24 and 26 may comprise either a single row or a multiplicity of rows. Preferably, however, not more than two rows of tubes are employed in bank 22 and not more than three in banks 24 and 26. It is also within the scope of the invention to eliminate any of the various tube banks illustrated. The fluid undergoing treatment may be passed in series, through adjacent tubes of each of the tube banks or parallel flow may be employed in any portion or all of the various tube banks and any desired sequence of flow through the various tube banks may be employed.

A tube bank 31 comprising, in the case illustrated, a plurality of superimposed horizontally parallel rows of horizontal tubes 32 is located within heating zone 7 of the furnace and, in the case here illustrated, communicates with another tube bank 33 comprising, in the case illustrated, a single horizontal row of horizontal tubes 34. Adjacent tubes in each row and adjacent rows of tubes in bank 31 may be connected at their ends, in series, by means of suitable return bends or headers (not shown). In the case here illustrated, connections between the near ends of the various tubes in banks 31 and 33 are indicated in the drawing by lines 35.

Tube banks 31 and 33 comprise fluid conduits through which a separate stream, preferably of different fluid than that passed through tube banks 22, 24 and 26, is directed and subjected to heating conditions which are controlled independent of the heating conditions employed in combustion zone 5, by means of controlling the firing in combustion zone 6 and the rate of flue gas recirculation to this zone. In the case here illustrated, the fluid to be heated enters the bottom row of tube bank 31, flowing through adjacent tubes in each row and through successive rows, in series, in a general upward direction through heating zone 7. The fluid passes from the last tube in the top row of bank 31, as indicated by line 36, to the tube in bank 33 most adjacent end wall 2 of the furnace and passes, in series, through adjacent tubes in bank 33, emerging from the last tube at the opposite end of this bank and from the furnace.

As already mentioned in connection with the fluid conduit in combustion and heating zone 5, it is entirely within the scope of the present invention to employ any desired form and arrangement of fluid conduits for the stream of fluid passing through heating zone 7 and combustion and heating zone 6. For example, a portion or all of the tubes in bank 31 may be connected in parallel instead of in series as may also the tubes in bank 33. Also, a plurality of rows of tubes (preferably not more than three) may be employed in bank 33, when desired, although only a single row is illustrated in the drawing, and a vertical tube bank, similar to bank 26, and comprising a single row or a plurality of rows of tubes may be employed adjacent end wall 2 of the furnace in combustion and heating zone 6. It is even within the scope of the invention to employ a bank of floor tubes in combustion and heating zone 6, although this will not ordinarily be desirable since relatively low rates of heating are preferred in combustion and heating zone 6.

Referring now to Fig. 2 of the drawing, the main furnace structure is similar to that illustrated in Fig. 1 except that, in Fig. 2, the size of combustion zone 6' is materially decreased relative to the size of combustion and heating zone 5' and no fluid conduit is employed in zone 6' of Fig. 2. Prime numbers 1' to 20' inclusive in Fig. 2 indicate portions of the furnace corresponding to those indicated by numbers 1 to 20, inclusive, in Fig. 1. Another difference between the two furnace structures illustrated in Figs. 1 and 2 is that in Fig. 2 ordinary firing ports 40 in the side walls of combustion zone 6' have been substituted for the firing tunnels 9 which communicate with zone 6 in the furnace structure of Fig. 1. This change is, of course, not essential and suitable firing tunnels such as those indicated at 9 in Fig. 1 may also be utilized to supply combustible fuel and air to combustion zone 6' in Fig. 2 either through the side walls of the furnace or through end wall 2'.

It will be understood that, as mentioned in connection with Fig. 1, fluid conduits of any suitable form may be employed in combustion and heating zone 5' and heating zone 7' of Fig. 2, one stream of fluid to be heated being passed through the fluid conduit in combustion and heating zone 5' while a separate stream, preferably of different characteristics, is passed through the fluid conduit in heating zone 7'. In the particular case here illustrated, a tube bank 41 comprising a single horizontal row of horizontal tubes 42 is located adjacent the floor of combustion and heating zone 5'. Another tube bank 43, also comprising a single horizontal row of horizontal tubes 44, is located adjacent the roof of combustion and heating zone 5' and another tube bank 45, comprising a single vertical row of horizontal tubes 46, is disposed adjacent wall 1' of the furnace within combustion and heating zone 5'. Tube banks 41, 43 and 45 comprise the fluid conduit through which one stream of fluid is passed and subjected to a relatively high rate of heating. In the case illustrated, the fluid enters the lower tube of bank 45, flowing upward through adjacent tubes of this bank in series, then through the tubes of bank 43, in series, in a general direction concurrent to the direction of firing and finally through the tubes of bank 41, in series, in the same general direction, being discharged from the end tube of bank 41 most adjacent bridge wall 8'. The direction of flow through any or all of the tube banks may be reversed, when desired, and any desired sequence of flow through the various tube banks may be employed.

A tube bank 47, comprising the fluid conduit wherein a separate stream of fluid is subjected to a relatively low rate of heating and over which recirculated flue gases and added fresh combustion products from combustion zone 6', commingled with combustion gases from combustion and heating zone 5', are passed, consists of a plurality of superimposed horizontally parallel rows of horizontal tubes 48 through which the fluid to be heated at a relatively low rate is passed, in the case illustrated, in a general direction countercurrent to the direction of travel of the combustion gases through this zone, the fluid entering the bottom row and emerging from the top row of tubes as indicated by the dotted lines and arrows.

Other types of fluid conduits and other methods of flow therethrough may, of course, be employed in heating zone 7' of Fig. 2, for example, parallel flow may be employed through the tubes in several of the lower rows of this zone with series flow through the tubes in the upper rows or any other desired and well known type of flow may be employed.

It is specifically within the scope of the present invention in a furnace of the general type illustrated in Fig. 2, when desired, to utilize zone 6' simply as a passage for recirculated flue gases, eliminating the introduction of fresh combustibles to this zone; in which case the total heat supplied to tube bank 47 is derived from the combustion gases from combustion and heating zone 5' and the recirculation of flue gases from heating zone 7' serves to reduce the temperature of the gases entering this zone and the rate of heating employed therein while maintaining a relatively high rate of heating in zone 5', independent of the conditions maintained in zone 7'.

Also, as previously mentioned, in connection with the furnace illustrated in Fig. 1, any suitable well known means may be employed for recirculating flue gases from the lower portion of heating zone 7' or, when desired, from flue 14' to combustion zone 6' in the furnace illustrated in Fig. 2 as well as that shown in Fig. 1. In fact many modifications of the two specific forms of furnaces here illustrated and described may be employed without departing from the scope of the present invention and it is not intended to limit the invention, except as defined in the appended claims.

I claim as my invention:

1. In a process for the heating of fluids wherein one stream of fluid is passed through a fluid conduit in a combustion and heating zone and therein subjected to a high rate of heating while a separate stream of different fluid is passed through another fluid conduit in a separately fired combustion and heating zone and there subjected to a relatively low rate of heating, the improvement which comprises passing the stream of fluid to be subjected to a relatively low rate of heating through a third fluid conduit in a separate heating zone, over which combustion gases from both of the previously mentioned combustion and heating zones are passed, and continuously recirculating a regulated quantity of the combustion gases having passed over said last mentioned fluid conduit to the combustion and heating zone wherein said relatively low rate of heating is employed.

2. In a process for the pyrolytic conversion of hydrocarbon oils wherein a stream of oil is passed through a fluid conduit within a combustion and heating zone of a furnace and there subjected to relatively high rates of heating while a separate stream of oil of different characteristics is passed through another fluid conduit in an independently fired combustion and heating zone of the same furnace and therein subjected to relatively low rates of heating, the improvement which comprises passing the last mentioned stream of oil through a third fluid conduit in a separate heating zone of the same furnace, over which combustion gases from both of the previously mentioned combustion and heating zones are passed, and continuously recirculating a regulated quantity of the combustion gases having passed over the last mentioned fluid conduit to the combustion and heating zone employing said relatively low rates of heating.

3. A furnace for heating fluids which comprises in combination, side walls, end walls, a roof and a floor, two independently fired combustion and heating zones, another heating zone separated from said independently fired combustion and heating zones but in direct communication therewith, fluid conduits within said combustion and heating zones and within said separate heating zone, means for passing combustion gases from both independently fired combustion and heating zones over the fluid conduit in said separate heating zone, means for passing a stream of fluid through the fluid conduit in one combustion and heating zone, means for passing a separate stream of fluid through the fluid conduits in the other combustion and heating zone and in said separate heating zone and means for continuously recirculating a regulated portion of the combustion gases having passed over the fluid conduit in said separate heating zone to the last mentioned combustion and heating zone.

4. In the heating of fluids in furnaces of the type having a pair of independently fired combustion and heating zones and a separate heating zone supplied with combustion gases from both said combustion zones, the method which comprises passing a fluid through one of said combustion zones and subjecting the same therein to a high rate of heating, simultaneously heating additional fluid under lower rates of heating in said separate zone and the other of said combustion zones, and continuously recirculating from said separate zone to said other combustion zone a regulated quantity of said combustion gases after their use in the heating of the fluid in the separate heating zone.

5. In the heating of fluids in furnaces of the type having a pair of independently fired combustion and heating zones and a separate heating zone supplied with combustion gases from both said combustion zones, the method which comprises passing a fluid through one of said combustion zones and subjecting the same therein to a high rate of heating, simultaneously passing a second fluid through said separate zone and the other of said combustion zones and subjecting the same therein to a lower rate of heating than the first-named fluid, and continuously recirculating from said separate zone to said other combustion zone a regulated quantity of said combustion gases after their use in the heating of the fluid in the separate heating zone.

6. A heating apparatus comprising a furnace having a pair of independently fired combustion and heating zones and an additional heating zone communicating with both said combustion zones, a fluid conduit comprising serially connected heating tubes in one of said combustion zones, a second fluid conduit comprising serially connected heating tubes disposed in the other of said combustion zones and in said additional heating zone, means for passing combustion gases from both said combustion zones over the tubes in said additional heating zone, and means for continuously recirculating a regulated portion of the combustion gases having passed over the tubes in said additional zone from the latter zone to said other combustion zone.

MARION W. BARNES.